J. M. SCHMIDT.
Carriage Spring.
No. 108,636. Patented Oct. 25, 1870.
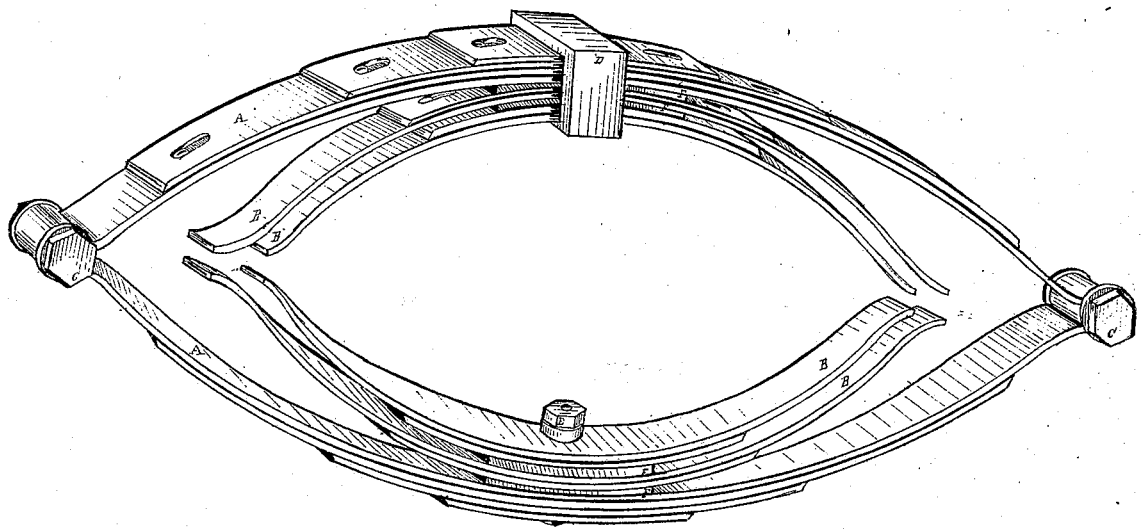
Witness:
E. F. Huyck
John Motschman
Inventor:
John M. Schmidt

JOHN M. SCHMIDT, OF NEW ALBANY, INDIANA.

Letters Patent No. 108,636, dated October 25, 1870.

IMPROVEMENT IN SPRINGS.

The Schedule referred to in these Letters Patent and making part of the same.

I, JOHN M. SCHMIDT, of the city of New Albany, county of Floyd and State of Indiana, have invented a certain new and useful Improvement in Wagon-Springs, of which the following is a specification.

The nature of this invention consists in a spring or springs within a spring, for the purpose of relieving the shock occasioned by the springs of a loaded wagon collapsing or coming together when run suddenly into a hole or against any obstruction, which would otherwise crush the spring in the absence of the inner spring to protect it.

The main or outside spring of this invention is made somewhat similar to those now in common use, except that the leaves may be held together either by a bolt through them or a sleeve to slip over them, with a small dovetail on the under side of the sleeve, which fits into a match groove in a small plate secured to the wagon, and afterward riveted on the ends to prevent it slipping out.

The inner spring or springs in this invention consists of two springs on each side, with two or more leaves in each; and between each of these springs there is a short leaf or washer, for the purpose of preventing the spring from bending at the bolt-holes, and thereby causing them to break in time.

Having thus fully described the nature of my invention, a more perfect understanding may be had by reference to the drawing, in which—

A A is the outer spring.

c c are the bolts at the ends.

B B are the inner springs.

F F are the short leaves or washers between them.

E is the bolt by which they are held together.

D is a sleeve, showing another mode of holding the spring together, and also in securing it to the wagon.

Having thus fully described the accompanying drawing in my invention,

What I claim as new, and desire to secure by Letters Patent, is—

The leaves or washers F F, in combination with the inner springs B B, the bolt E, and the sleeve D, the outer springs A A at their ends by bolts c c, substantially as and for the purpose hereinbefore set forth.

JOHN M. SCHMIDT.

Witnesses:
  E. F. HUYCK,
  JOHN MOTSCHMAN.